(12) United States Patent
Monroe

(10) Patent No.: US 7,373,115 B2
(45) Date of Patent: May 13, 2008

(54) APPARATUS FOR TRANSMIT AND RECEIVE SWITCHING IN A TIME-DIVISION DUPLEXING WIRELESS NETWORK

(75) Inventor: Robert W. Monroe, Melissa, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 11/079,754

(22) Filed: Mar. 14, 2005

(65) Prior Publication Data
US 2005/0255810 A1 Nov. 17, 2005

Related U.S. Application Data

(60) Provisional application No. 60/570,948, filed on May 13, 2004.

(51) Int. Cl.
H04B 1/46 (2006.01)
(52) U.S. Cl. .................. 455/82; 455/83; 333/101
(58) Field of Classification Search .................. 455/78, 455/82, 83, 84, 550.1; 333/100, 101, 124
See application file for complete search history.

(56) References Cited

U.S. PATENT DOCUMENTS 5,701,595 A * 12/1997 Green, Jr. ..................... 455/83
6,072,994 A * 6/2000 Phillips et al. ................. 455/84
6,226,275 B1 * 5/2001 Yang et al. .................. 370/280
6,374,094 B1 * 4/2002 Zappala .................... 455/188.1
6,567,648 B1 * 5/2003 Ahn et al. ..................... 455/83
7,236,519 B2 * 6/2007 Kubo et al. .................. 375/219

* cited by examiner

Primary Examiner—Nguyen T. Vo

(57) ABSTRACT

A transmit-receive (T/R) switch for coupling a TDD transceiver to an antenna. The T/R switch comprises 1) a first circulator having a first port for receiving a transmit signal from the transceiver during transmit mode, a second port for sending the transmit signal to the antenna during transmit mode and receiving a received signal from the antenna during receive mode, and a third port for sending the received signal towards the transceiver during receive mode. The T/R switch further comprises 2) a second circulator having a first port for receiving the received signal from the third port of the first circulator during receive mode and a second port for sending the received signal towards the transceiver during receive mode, and 3) a termination load coupled to a third port of the second circulator. The circulators divert RF energy reflected from the antenna during transmit mode into the termination load.

18 Claims, 8 Drawing Sheets

US 7,373,115 B2

APPARATUS FOR TRANSMIT AND RECEIVE SWITCHING IN A TIME-DIVISION DUPLEXING WIRELESS NETWORK

CROSS-REFERENCE TO RELATED APPLICATION AND CLAIM OF PRIORITY

The present invention is related to that disclosed in U.S. Provisional Patent No. 60/570,948, filed May 13, 2004, entitled "Apparatus and Method for Transmit/Receive Switching of a Base Transceiver Subsystem Operating in a Wireless TDD Network". U.S. Provisional Patent No. 60/570,948 is assigned to the assignee of the present application. The subject matter disclosed in U.S. Provisional Patent No. 60/570,948 is hereby incorporated by reference into the present disclosure as if fully set forth herein. The present application hereby claims priority under 35 U.S.C. §119(e) to U.S. Provisional Patent No. 60/570,948.

TECHNICAL FIELD OF THE INVENTION

The present invention relates generally to time-division duplexing (TDD) wireless networks and, more specifically, to a transmit-receive switch for use in a base station of a time-division duplex (TDD) wireless network.

BACKGROUND OF THE INVENTION

A base station in a time-division duplexing (TDD) wireless network uses a high-speed transmit-receive (T/R) switch to alternately couple the antenna to the transmit path during transmit periods and to the receive path during receive periods. Conventional base stations generally use pin-diode switch modules as transmit-receive switches. Circulators have been used in the past for time duplexing of radar signals, but are generally not used in base stations.

FIG. 1A illustrates selected portions of conventional base station 100A according to one embodiment of the prior art. Base station 100A comprises time-division duplexing (TDD) transceiver (X-CVR) 110, pin-diode switch module 115, and antenna 150. TDD transceiver 110 comprises a transmit path and a receive path. The transmit path of TDD transceiver 110 comprises transmit (XMIT) circuitry 111, power amplifier (PA) 112, low-noise amplifier (LNA) 121, and receive (RCV) circuitry 122.

Pin-diode switch module 115 comprises capacitor 125, inductor 130, capacitor 135, pin-diode 140, capacitor 145, quarter-wave ($\lambda$/4) transmission line 155, pin diode 160, and capacitor 165. A T/R switch control signal from a base transceiver subsystem (BTS) controller (not shown) is coupled to a filtered bias line (i.e., capacitor 135 and inductor 130) that turns pin-diode 140 on during transmission and off during reception. During transmit periods, quarter-wave transmission line 155 and pin-diode 160 present a high impedance (or open circuit) to the transmit signal from power amplifier 112. During receive periods, quarter-wave transmission line 155 and the off-state (open) pin-diode 160 in parallel with the LNA input impedance (e.g., 50 ohms) present a 50 ohm impedance to the receive signal from antenna 150.

Unfortunately, however, pin-diode 140 in the transmitter path is the cause of high transmitter insertion loss (e.g., 0.75 dB to 1.5 dB) and high levels of harmonics and third-order inter-modulation products. The harmonics and inter-modulation products are caused by the non-linear characteristics of pin-diode 140.

FIG. 1B illustrates selected portions of a conventional radar system according to an alternate embodiment of the prior art. Radar system 100B comprises transmitter 180, receiver 185, circulator 190 and antenna 195. Circulator 190 has three ports, namely Port 1, Port 2 and Port 3. Signals entering one of the ports follow the circling arrow and exit at the next port.

Thus, in the ideal case, transmit signals from transmitter 180 enter Port 1 and are emitted at Port 2 to antenna 195, and no portion of the transmit signal is emitted at Port 3 to receiver 185. Also, in the ideal case, receive signals from antenna 195 enter Port 2 and are emitted at Port 3 to receiver 185, and no portion of the receive signal is emitted at Port 1 to transmitter 180.

However, a circulator by itself cannot protect the receiver input in the case of high antenna voltage standing wave ratio (VSWR). A high VSWR antenna condition reflects part or all of the transmit signal-power directly into receiver 185, which can damage the low-noise amplifier. A secondary problem is that, even though there is no transmit signal during receive mode, the output of transmitter 180 has substantial noise present due mostly to high transmitter gain. This noise can reflect off antenna 195, enter receiver 185, and desensitize receiver 185 due to decreased signal-to-noise ratio (SNR). Thus, the circulator configuration in FIG. 1B is not a good solution for high power transmitters, unless it is certain that antenna VSWR is low prior to transmitting.

Therefore, there is a need in the art for improved base stations for use in time-division duplexing (TDD) wireless networks. In particular, there is a need for an improved transmit-receive switch for use in a base transceiver subsystem of a TDD wireless network.

SUMMARY OF THE INVENTION

The present invention uses an arrangement of circulators, tunable filters, transmission lines and pin diodes to divert RF energy reflected from the antenna during transmit mode into a termination load, where the reflected RF energy is safely dissipated. The present invention also uses a pin diode and a quarter-wave transmission line to reflect noise from the power amplifier away from the receive path during receive mode.

To address the above-discussed deficiencies of the prior art, it is a primary object of the present invention to provide, a transmit-receive switch for coupling a radio frequency (RF) transceiver capable of time-division duplex operation to an antenna. According to an advantageous embodiment of the present invention, the transmit-receive switch comprises: 1) a first circulator having a first port for receiving a transmit signal from a transmit path of the RF transceiver during transmit mode, a second port for sending the transmit signal to the antenna during transmit mode and receiving a received signal from the antenna during receive mode, and a third port for sending the received signal towards a receive path of the RF transceiver during receive mode. The transmit-receive switch further comprises: 2) a second circulator having a first port for receiving the received signal from the third port of the first circulator during receive mode and a second port for sending the received signal towards the receiver input of the RF transceiver during receive mode.

According to one embodiment of the present invention, the transmit-receive switch further comprises a termination load coupled to a third port of the second circulator.

According to another embodiment of the present invention, the RF energy reflected from the antenna during transmit mode is received in the second port of the first circulator and is sent from the third port of the first circulator to the first port of the second circulator.

According to still another embodiment of the present invention, the reflected RF energy received from the first circulator in the first port of the second circulator during transmit mode is sent from the second port of the second circulator towards the receive path of the RF transceiver.

According to yet another embodiment of the present invention, RF energy reflected back from the RF transceiver during transmit mode is received in the second port of the second circulator and is sent from the third port of the second circulator towards the termination load.

According to a further embodiment of the present invention, the transmit-receive switch further comprises a quarter-wave transmission line and a pin-diode connected in series between the first input of the first circulator and ground, wherein the quarter-wave transmission line appears as a high impedance to the transmit signal during transmit mode and appears as a low impedance to a noise signal from a power amplifier in the RF transceiver during the receive mode.

According to a still further embodiment of the present invention, the transmit-receive switch further comprises a tunable filter coupled between the second port of the second circulator and the receive path of the RF transceiver, wherein the tunable filter allows the received signal to pass to the receive path of the RF transceiver during receive mode and reflects the reflected RF signal back to the second circulator during transmit mode.

According to a yet further embodiment of the present invention, the transmit-receive switch further comprises a tunable filter and a quarter-wave transmission line coupled in series between the second port of the second circulator and the receive path of the RF transceiver, wherein the quarter-wave transmission line appears as a high impedance during transmit mode and reflects the reflected RF signal back to the second circulator during transmit mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided in this document apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 2 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged base station.

Figure 2:
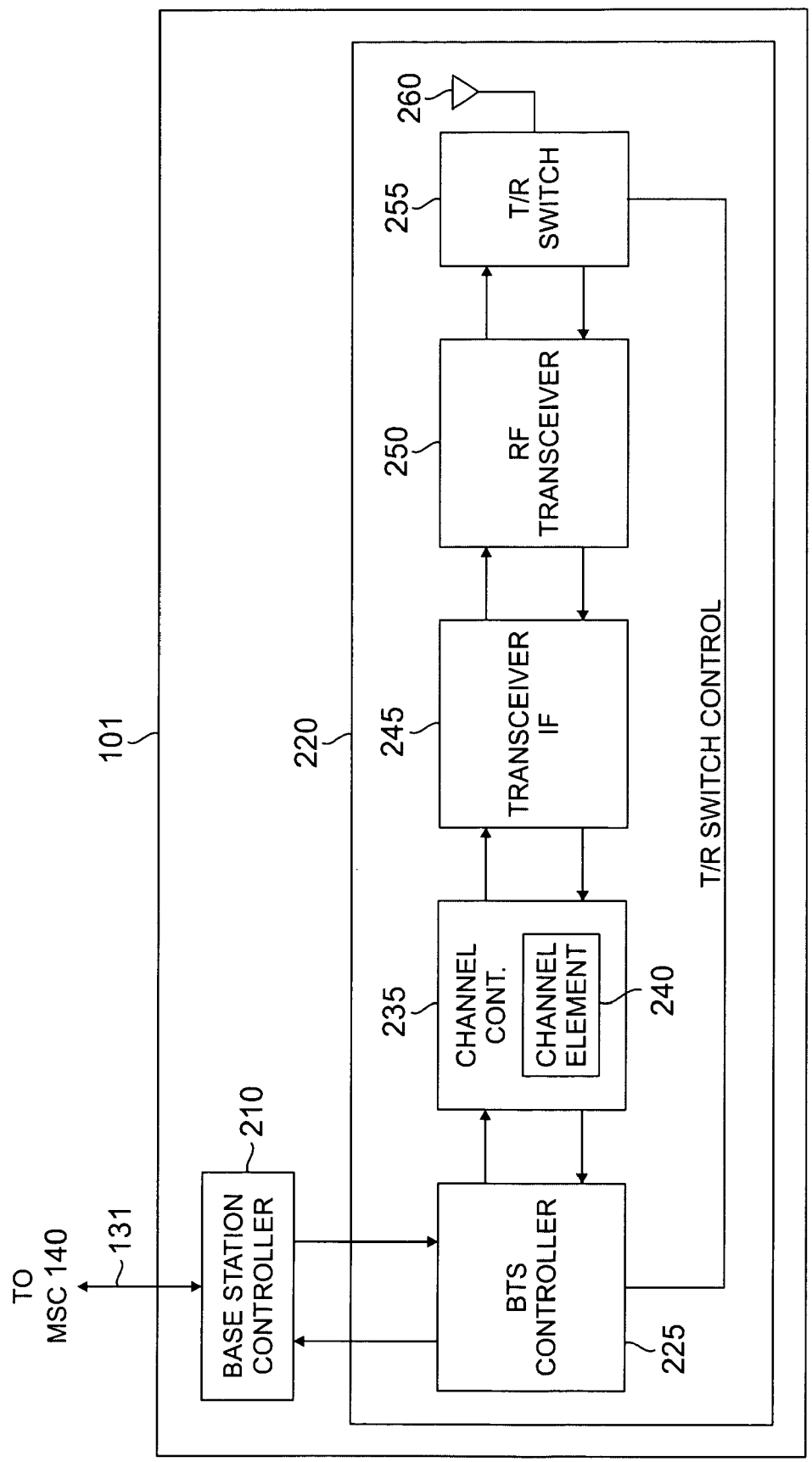
FIG. 2 illustrates a base station that includes a transmit-receive switch according to the principles of the present invention.

FIG. 2 illustrates exemplary base station 101, which includes a transmit-receive switch according to the principles of the present invention. Base station 101 comprises base station controller (BSC) 210 and base transceiver station (BTS) 220. BSC 210 manages the resources in a cell site, including BTS 220. BTS 220 comprises BTS controller 225, channel controller 235 (which contains representative channel element 240), transceiver interface (IF) 245, RF transceiver 250, transmit-receive (T/R) switch 255, and antenna 260.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver 250.

BTS controller 225 also controls the operation of transmit-receive (T/R) switch 255. T/R switch 255 transfers bi-directional RF signal between RF transceiver 250 and antenna 260. Antenna 260 transmits forward channel signals received from T/R switch 255 to mobile stations in the coverage area of BS 101. Antenna 260 also sends to T/R switch 255 reverse channel signals received from mobile stations in the coverage area of BS 101. In a preferred embodiment of the present invention, antenna 260 may be multi-sector antenna, such as a three-sector antenna array in which each antenna sector is responsible for transmitting and receiving in a 120° arc of coverage area.

Figure 3:
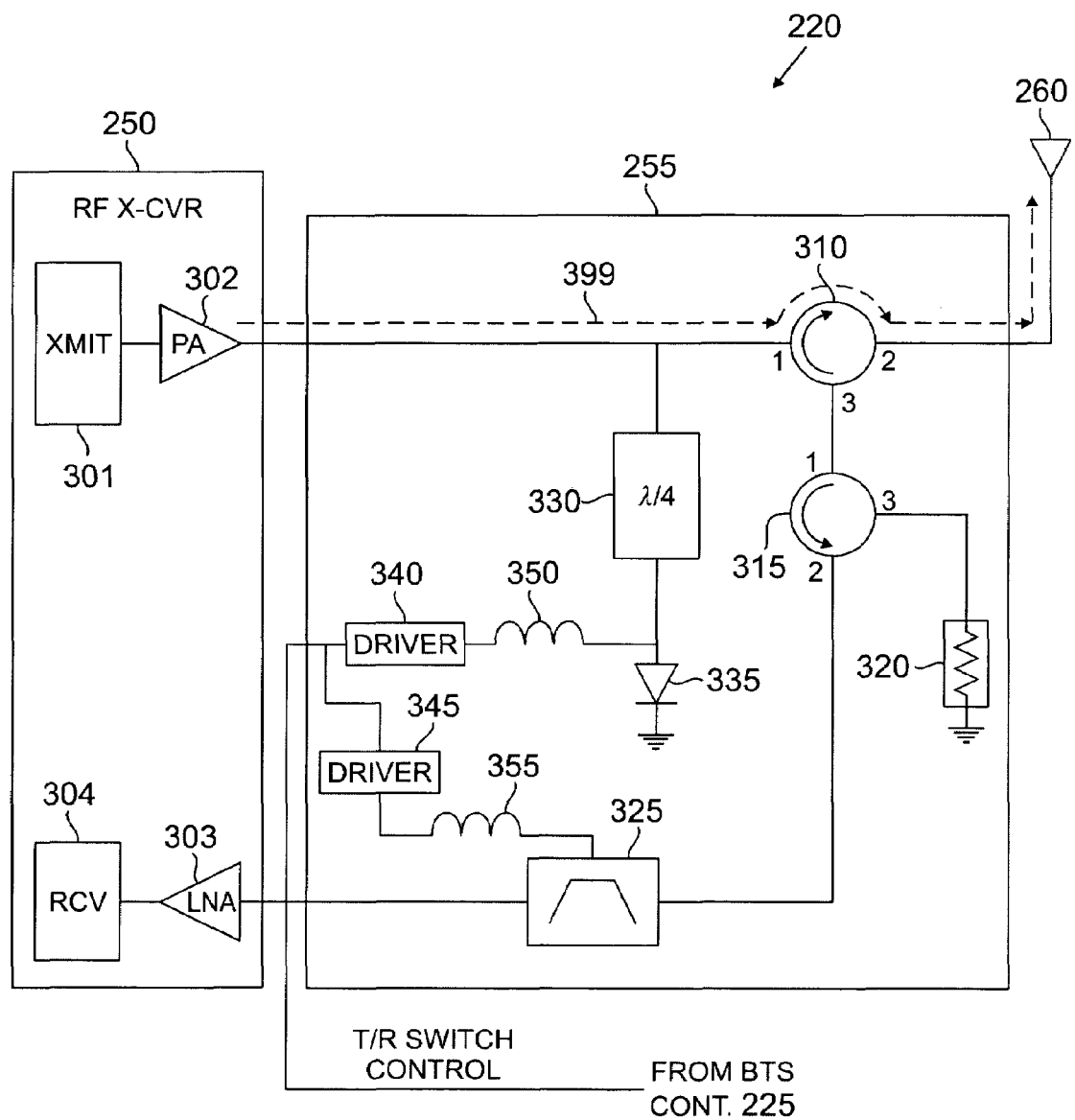
FIG. 3 illustrates the transmit-receive (T/R) switch in FIG. 2 in greater detail according to a first embodiment of the present invention.

FIG. 3 illustrates transmit-receive (T/R) switch 255 in BTS 220 in greater detail according to a first embodiment of the present invention. RF transceiver (X-CVR) 250 in BTS 220 comprises a transmit path and a receive path. The transmit path of RF transceiver 250 comprises transmit (XMIT) circuitry 301 and power amplifier (PA) 302. The receive path of RF transceiver 250 comprises low-noise amplifier (LNA) 303 and receive (RCV) circuitry 304.

Figure 1A:
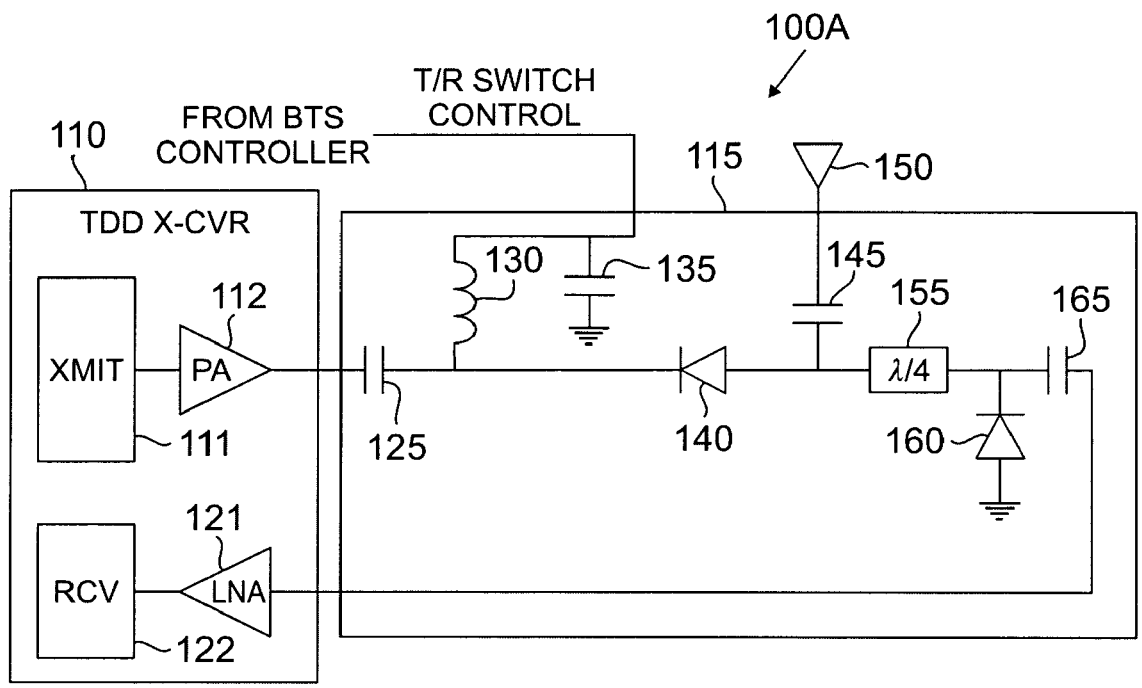
FIG. 1A illustrates selected portions of a conventional base station according to one embodiment of the prior art.
Figure 1B:
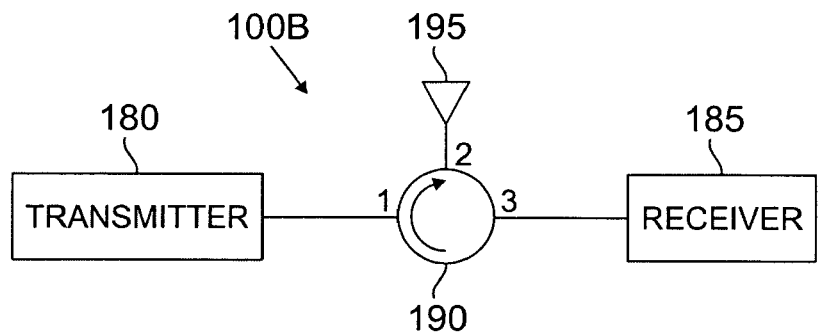
FIG. 1B illustrates selected portions of a conventional radar system according to an alternate embodiment of the prior art.

T/R switch 255 comprises circulators 310 and 315, high-power termination load 320 (e.g., 50 ohms), frequency tunable filter 325, quarter-wave ($\lambda/4$) transmission line 330, pin diode 335, drivers 340 and 345, and inductors 350 and 355. T/R switch 255 improves upon the circulator T/R switch in FIG. 1B by protecting the receiver input from high power reflected from the antenna during transmit mode and isolates the receiver from transmitter noise during receive mode.

During transmit mode, BTS controller 225 applies an enabling control voltage to pin diode 335 via driver 340 and inductor 350. During transmit mode, pin diode 335 is on and appears as a near perfect short circuit. Quarter-wave transmission line 330 is an impedance inverter and presents a near perfect open circuit to the output signal from PA 302 during transmit mode. Tunable filter 325 is used to reflect unwanted transmitter power away from the receiver input. Thus, during transmit mode, BTS controller 225 applies a control voltage to tunable filter 325 via driver 345 and inductor 355 that tunes tunable filter 325 off-resonance to $F_{c2}$. Thus, tunable filter 325 appears as a short circuit.

During receive mode, BTS controller 225 applies a control voltage to tunable filter 325 via driver 345 and inductor 355 that tunes tunable filter 325 to the correct receive band frequency. During receive mode, pin diode 335 is off and appears as a near perfect open circuit. Quarter-wave transmission line 330 is an impedance inverter and presents a near perfect short circuit to the noise signal from PA 302 during receive mode.

RF transceiver 250 transmits TDD signals during transmit mode, the RF power flows out of PA 302 toward pin diode 335 and quarter-wave transmission line 330. Quarter-wave transmission line 330 presents a near perfect open circuit to the transmit signal and allows the transmit signal to flow to low-loss (e.g., 0.25 dB) circulator 310 and out to antenna 260. Dotted line 399 shows the path of the transmit RF signal in FIG. 3. The RF signal enters circulator 310 at Port 1 and exits at Port 2 on the way to antenna 260.

Figure 4:
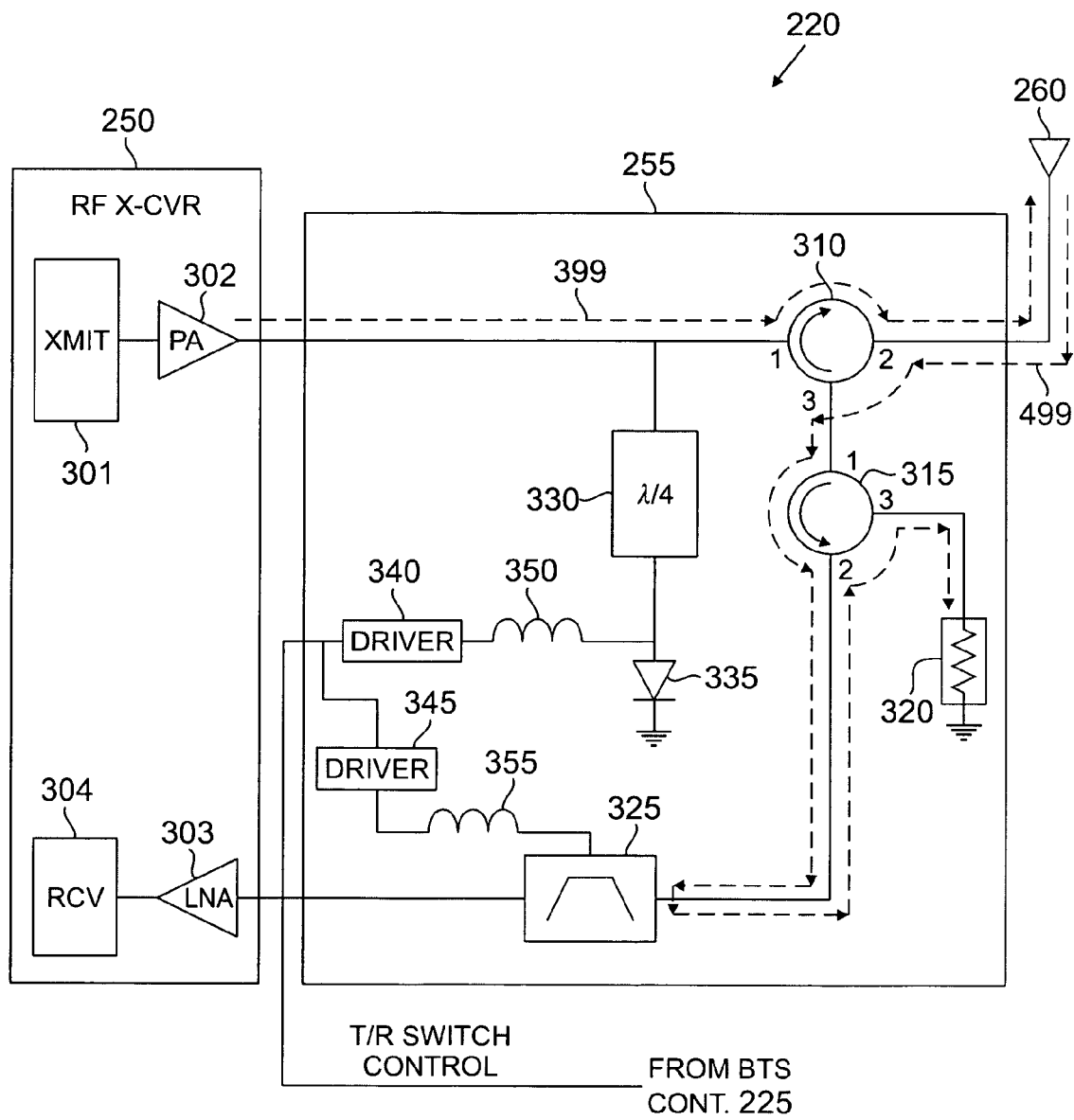
FIG. 4 illustrates an abnormal (high antenna VSWR) transmit mode in the exemplary transmit-receive (T/R) switch in FIG. 3.

FIG. 4 illustrates an abnormal transmit mode in exemplary transmit-receive (T/R) switch 255. If a higher-than-normal VSWR condition exists at antenna 260 during transmit mode, RF power reflects off antenna 260 and enters circulator 310 at Port 2. The reflected RF power exits circulator 310 at Port 3 and enters circulator 315 at Port 1. The reflected RF power then exits circulator 315 at Port 2 and sees a nearly short-circuit at the input of tunable filter 325. The RF power then reflects off tunable filter 325, re-enters circulator 315 at Port 2, exits circulator 315 at Port 3 and goes into high-power termination load 320, where it is safely dissipated. Thus, circulator 315 and termination load 320 are used to safely dissipate any transmitter power reflected from tunable filter 325. Dotted line 399 shows the path of RF signal from PA 302 to antenna 260 and dotted line 499 shows the path of the RF signal reflected from antenna 260 due to higher than normal VSWR in FIG. 4.

Figure 5:
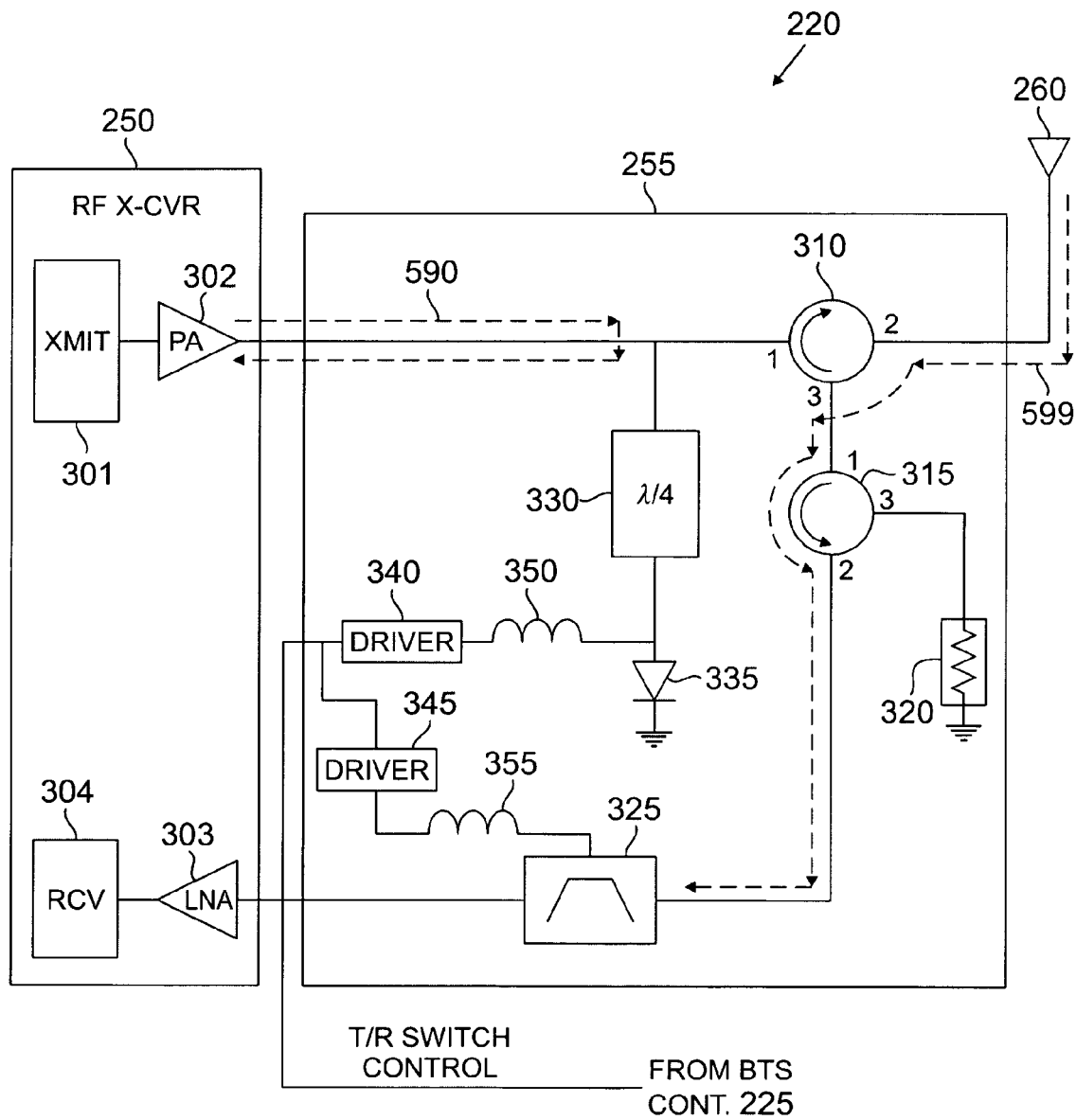
FIG. 5 illustrates a normal receive mode in the exemplary transmit-receive (T/R) switch in FIG. 3.

FIG. 5 illustrates a normal receive mode in transmit-receive (T/R) switch 255. During receive mode, pin diode 335 is off and appears as a near perfect open circuit. Quarter-wave transmission line 330 is an impedance inverter and presents a near perfect short circuit to noise from PA 320. During receive mode, filter 325 is tuned to resonance $F_d$ and appears as a 50 ohm impedance. Received RF signals enter antenna 260 and flow through circulators 310 and 315 as indicated by dotted line 599. The received RF signal then flows through tunable filter 325 and into LNA 303. The noise signal from PA 302 flows toward circulator 310, but encounters a high VSWR at quarter-wave transmission line 330, which looks like a short, and is reflected back to PA 302, as indicated by dotted line 590, thereby reducing the amount of PA noise that could reach the receiver.

Figure 6:
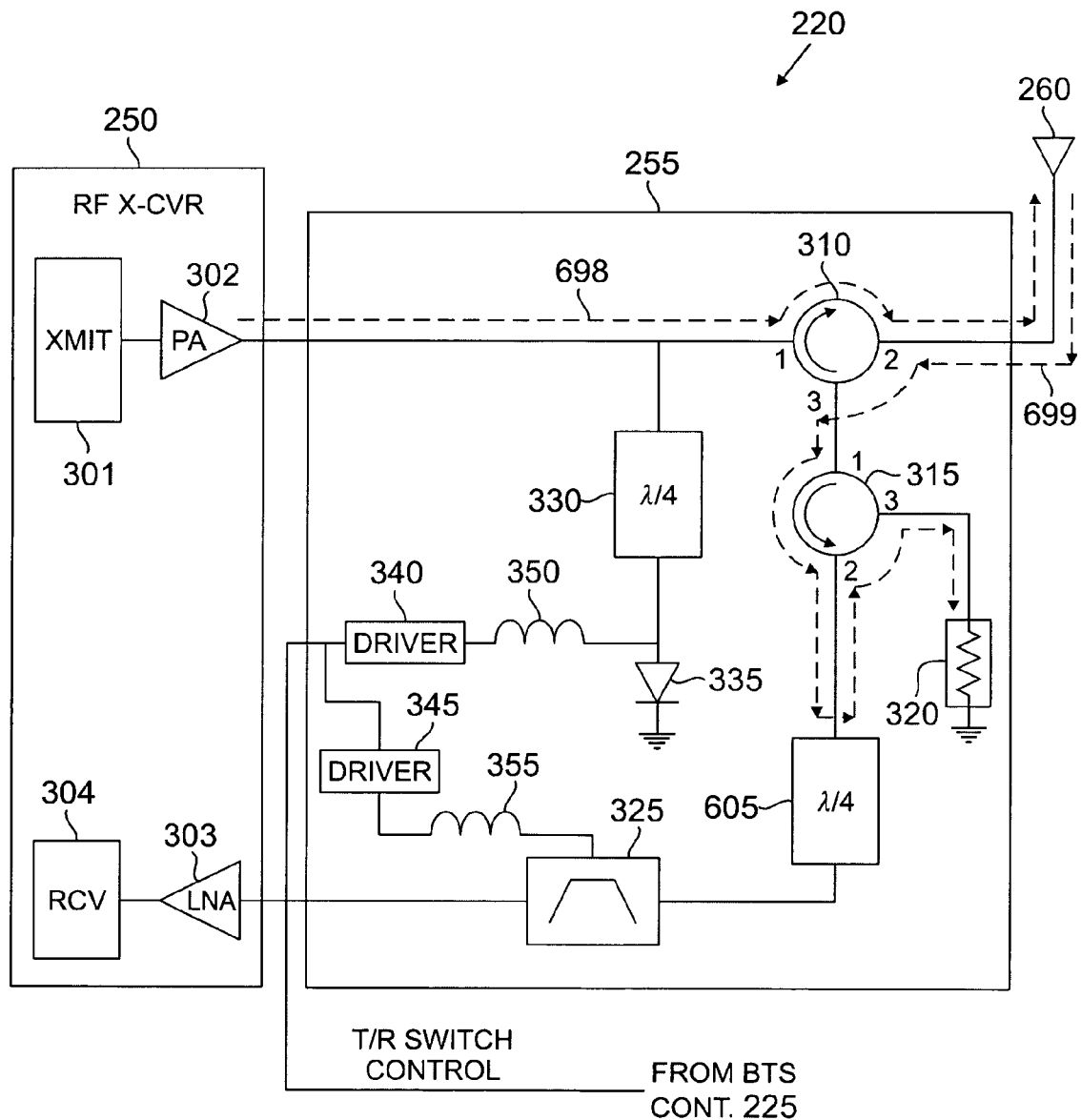
FIG. 6 illustrates the transmit-receive (T/R) switch during abnormal transmit mode in FIG. 2 in greater detail according to a second embodiment of the present invention.

FIG. 6 illustrates transmit-receive (T/R) switch 255 in FIG. 2 in greater detail according to a second embodiment of the present invention. The second embodiment of T/R switch 255 in FIG. 6 is substantially the same as the first embodiment of T/R switch 255 in FIG. 3, except that quarter-wave transmission line 605 has been inserted between circulator 315 and tunable filter 325. During transmit mode, filter 325 is tuned off resonance and appears as a short. Quarter-wave transmission line 605 inverts the impedance, so that it appears as a very high VSWR. For example, if impedance of filter 325 during transmit mode is 1 ohm, then quarter-wave transmission line 605 appears as: $Z_{IN}=Z_0^2/Z_L=50^2/(1)=2500$ ohms.

This high impedance prevents large RF signal power from reaching tunable filter 325 during transmit mode. Dotted line 698 shows the path of the transmitted RF signal from PA 302 to antenna 260. Dotted line 699 illustrates the path of the RF signal reflected off antenna 260 due to higher than normal VSWR during transmit mode. As a result, a smaller, cheaper filter 325 with a power rating of less than a quarter watt is required. This is important since current state of the art tunable filters that can tune fast enough for TDD operation are rated for cell phone power levels.

Figure 7:
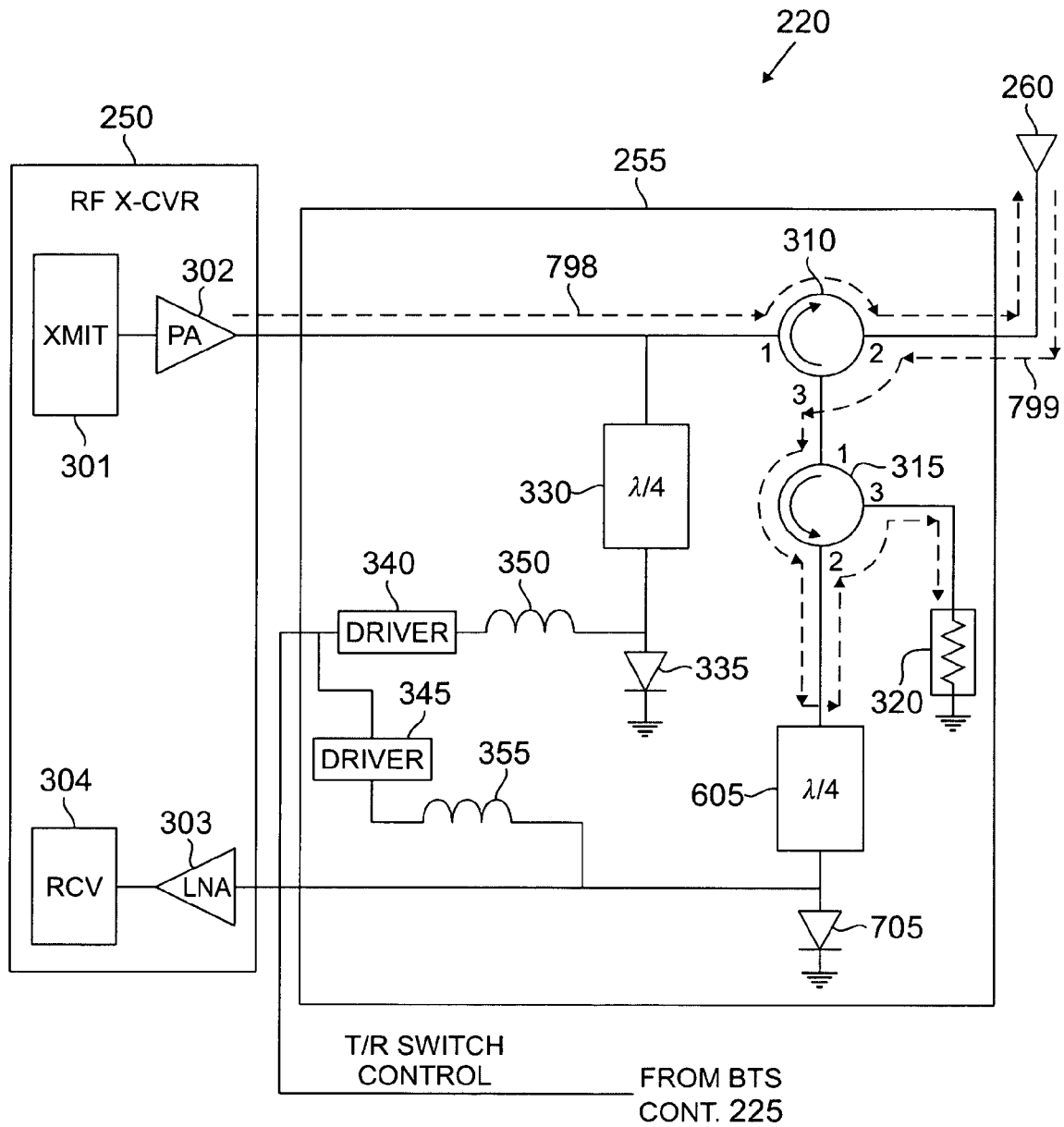
FIG. 7 illustrates the transmit-receive (T/R) switch in FIG. 2 in greater detail according to a third embodiment of the present invention.

FIG. 7 illustrates transmit-receive (T/R) switch 255 according to a third embodiment of the present invention. The third embodiment of T/R switch 255 in FIG. 7 is substantially the same as the first embodiment of T/R switch 255 in FIG. 3, except that quarter-wave transmission line 605 and pin diode 705 replace filter 325. During transmit mode, pin diode 705 is on and quarter-wave transmission line 605 inverts the impedance so that it appears as a very high VSWR. For example, if the impedance of pin diode 705 during transmit mode is 1 ohm, and LNA input impedance is 50 ohms, then quarter-wave transmission line 605 appears as: $Z_{IN}=Z_0^2/Z_L=50^2/(50\|1)=2550$ ohms and the VSWR is 2550/50=51:1. This is a cheaper solution than using tunable filter 325, since fast, low impedance pin diodes are readily available for only a few dollars. Dotted line 798 shows the path of the transmitted RF signal from PA 302 to antenna 260. Dotted line 799 illustrates the path of the RF signal reflected off antenna 260 due to higher than normal VSWR during transmit mode.

Figure 8:
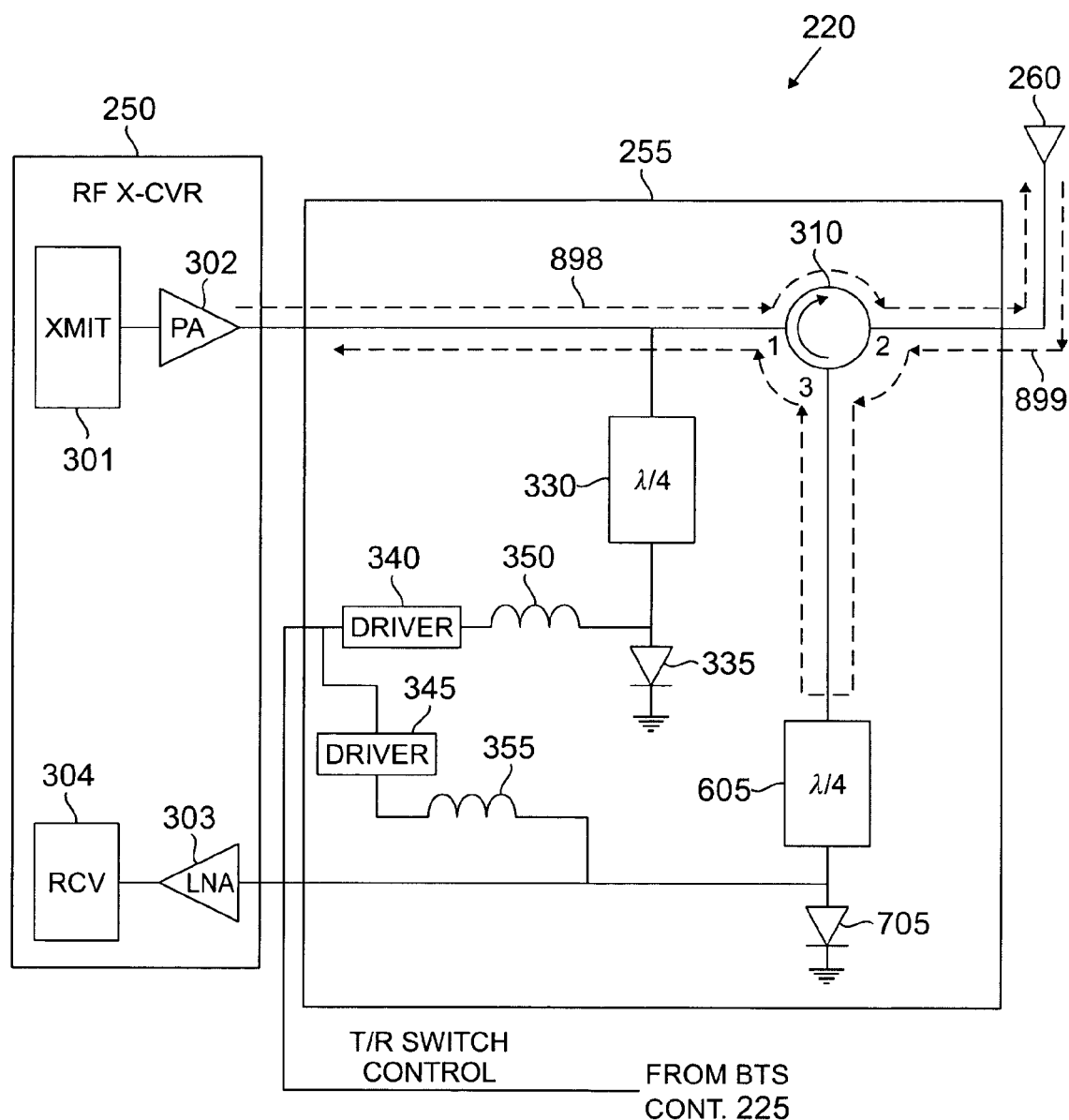
FIG. 8 illustrates the transmit-receive (T/R) switch in FIG. 2 in greater detail according to a fourth embodiment of the present invention.

FIG. 8 illustrates transmit-receive (T/R) switch 255 in greater detail according to a fourth embodiment of the present invention. The embodiment in FIG. 8 is similar to the embodiment in FIG. 7 except that circulator 315 and termination load 320 are removed. This lowers the cost of T/R switch 255. These components may be eliminated because some commercially available versions of power amplifier 302 in RF transceiver 320 already have a circulator and termination load built in. The built-in circulator and termination load in PA 302 dissipate the reflected RF power from T/R switch 255.

During transmit mode, RF transmitter power reflected from a high VSWR antenna is reflected back from quarter-wave transmission line 605, as in FIG. 7. The reflected RF power then flows from Port 3 to Port 1 of circulator 310 and back towards PA 320, where it is safely dissipated by the built-in circulator and termination load in PA 302. Dotted line 898 shows the path of the transmitted RF signal from PA 302 to antenna 260. Dotted line 899 illustrates the path of the RF signal reflected off antenna 260 due to higher than normal VSWR during transmit mode.

Although the present invention has been described with an exemplary embodiment, various changes and modifications may be suggested to one skilled in the art. It is intended that the present invention encompass such changes and modifications as fall within the scope of the appended claims.

What is claimed is:

1. A transmit-receive switch for coupling a radio frequency (RF) transceiver capable of time-division duplex operation to an antenna, said transmit-receive switch comprising:
    a first circulator having a first port for receiving a transmit signal from a transmit path of said RF transceiver during transmit mode, a second port for sending said transmit signal to said antenna during transmit mode and receiving a received signal from said antenna during receive mode, and a third port for sending said received signal towards a receive path of said RF transceiver during receive mode;
    a second circulator having a first port for receiving said received signal from said third port of said first circulator during receive mode and a second port for sending said received signal towards said RF transceiver during receive mode; and
    a tunable filter and a quarter-wave transmission line coupled in series between said second port of said second circulator and said receive path of said RF transceiver, wherein said quarter-wave transmission line appears as a high impedance during transmit mode and reflects a reflected RF signal back to said second circulator during transmit mode.

2. The transmit-receive switch as set forth in claim 1, further comprising a termination load coupled to a third port of said second circulator.

3. The transmit-receive switch as set forth in claim 2, wherein a RF energy reflected from said antenna during transmit mode is received in said second port of said first circulator and is sent from said third port of said first circulator to said first port of said second circulator.

4. The transmit-receive switch as set forth in claim 3, wherein said reflected RF energy received from said first circulator in said first port of said second circulator during transmit mode is sent from said second port of said second circulator towards, said receive path of said RF transceiver.

5. The transmit-receive switch as set forth in claim 4, wherein said RF energy reflected back from said RF transceiver during transmit mode is received in said second port of said second circulator and is sent from said third port of said second circulator towards said termination load.

6. The transmit-receive switch as set forth in claim 5, further comprising a quarter-wave transmission line and a pin-diode connected in series between said first port of said first circulator and ground, wherein said quarter-wave transmission line appears as a high impedance to said transmit signal during transmit mode and appears as a low impedance to a noise signal from a power amplifier in said RF transceiver during said receive mode.

7. The transmit-receive switch as set forth in claim 5, further comprising a tunable filter coupled between said second port of said second circulator and said receive path of said RF transceiver, wherein said tunable filter allows said received signal to pass to said receive path of said RF transceiver during receive mode and reflects a reflected RF signal back to said second circulator during transmit mode.

8. For use in a wireless network, a base station capable of communicating with a plurality of mobile stations comprising:
    a radio frequency (RF) transceiver capable of time-division duplex operation; and
    a transmit-receive switch for coupling said RF transceiver to an antenna, said transmit-received switch comprising:
    a first circulator having a first port for receiving a transmit signal from a transmit path of said RF transceiver during transmit mode, a second port for sending said transmit signal to said antenna during transmit mode and receiving a received signal from said antenna during receive mode, and a third port for sending said received signal towards a receive path of said RF transceiver during receive mode;
    a second circulator having a first port for receiving said received signal from said third port of said first circulator during receive mode and a second port for sending said received signal towards said RF transceiver during receive mode; and
    a tunable filter and a quarter-wave transmission line coupled in series between said second port of said second circulator and said receive path of said RF transceiver, wherein said quarter-wave transmission line appears as a high impedance during transmit mode and reflects a reflected RF signal back to said second circulator during transmit mode.

9. The base station as set forth in claim 8, wherein said transmit-receive switch further comprises a termination load coupled to a third port of said second circulator.

10. The base station as set forth in claim 9, wherein a RF energy reflected from said antenna during transmit mode is received in said second port of said first circulator and is sent from said third port of said first circulator to said first port of said second circulator.

11. The base station as set forth in claim 10, wherein said reflected RF energy received from said first circulator in said first port of said second circulator during transmit mode is sent from said second port of said second circulator towards said receive path of said RF transceiver.

12. The base station as set forth in claim 11, wherein RF energy reflected back from said RF transceiver during transmit mode is received in said second port of said second circulator and is sent from said third port of said second circulator towards said termination load.

13. The base station as set forth in claim 12, wherein said transmit-received switch further comprises a quarter-wave transmission line and a pin-diode connected in series between said first port of said first circulator and ground, wherein said quarter-wave transmission line appears as a high impedance to said transmit signal during transmit mode and appears as a low impedance to a noise signal from a power amplifier in said RF transceiver during said receive mode.

14. The base station as set forth in claim 12, wherein said transmit-receive switch further comprises a tunable filter coupled between said second port of said second circulator and said receive path of said RF transceiver, wherein said tunable filter allows said received signal to pass to said receive path of said RF transceiver during receive mode and reflects a reflected RF signal back to said second circulator during transmit mode.

15. A wireless network comprising a plurality of base stations capable of communicating with said plurality of mobile stations in a coverage area of said wireless network, each of said plurality of base stations comprising:

a radio frequency (RF) transceiver capable of time-division duplex operation; and a transmit-receive switch for coupling said RF transceiver to an antenna, said transmit-received switch comprising:

a first circulator having a first port for receiving a transmit signal from a transmit path of said RF transceiver during transmit mode, a second port for sending said transmit signal to said antenna during transmit mode and receiving a received signal from said antenna during receive mode, and a third port for sending said received signal towards a receive path of said RE transceiver during receive mode;

a second circulator having a first port for receiving said received signal from said third port of said first circulator during receive mode and a second port for sending said received signal towards said RF transceiver during receive mode; and a tunable filter and a quarter-wave transmission line coupled in series between said second port of said second circulator and said receive path of said RF transceiver, wherein said quarter-wave transmission line appears as a high impedance during transmit mode and reflects a reflected RF signal back to said second circulator during transmit mode.

16. The wireless network as set forth in claim 15, wherein said transmit-receive switch further comprises a termination load coupled to a third port of said second circulator.

17. The wireless network as set forth in claim 16, wherein a RF energy reflected from said antenna during transmit mode is received in said second port of said first circulator and is sent from said third port of said first circulator to said first port of said second circulator.

18. The wireless network as set forth in claim 17, wherein said reflected RF energy received from said first circulator in said first port of said second circulator during transmit mode is sent from said second port of said second circulator towards said receive path of said RF transceiver.

* * * * *

UNITED STATES PATENT AND TRADEMARK OFFICE
CERTIFICATE OF CORRECTION

PATENT NO. : 7,373,115 B2 Page 1 of 1
APPLICATION NO. : 11/079754
DATED : May 13, 2008
INVENTOR(S) : Robert W. Monroe It is certified that error appears in the above-identified patent and that said Letters Patent is hereby corrected as shown below:

Column 8, line 55, delete "transmit-received" and replace with --transmit-receive--.

Signed and Sealed this

Twenty-ninth Day of September, 2009

David J. Kappos
*Director of the United States Patent and Trademark Office*